US009145266B2

(12) United States Patent
Roy (10) Patent No.: US 9,145,266 B2
(45) Date of Patent: Sep. 29, 2015

(54) BELT SCRAPER MOUNTING (71) Applicant: TEGA Industries Limited, Kolkata (IN)

(72) Inventor: Saroj K. Roy, Kolkata (IN)

(73) Assignee: TEGA Industries Limited, Kolkata (IN)

( * ) Notice: Subject to any disclaimer, the term of this patent is extended or adjusted under 35 U.S.C. 154(b) by 0 days.

(21) Appl. No.: 14/371,135

(22) PCT Filed: Nov. 20, 2012

(86) PCT No.: PCT/IN2012/000756
§ 371 (c)(1),
(2) Date: Jul. 8, 2014

(87) PCT Pub. No.: WO2013/105111
PCT Pub. Date: Jul. 18, 2013

(65) Prior Publication Data
US 2014/0360842 A1 Dec. 11, 2014

(30) Foreign Application Priority Data

Jan. 9, 2012 (IN) ................. 22/KOL/2012

(51) Int. Cl.
*B65G 45/16* (2006.01)

(52) U.S. Cl.
CPC ........... *B65G 45/16* (2013.01); *Y10T 29/49826* (2015.01)

(58) Field of Classification Search
CPC ...................................... B65G 45/16
USPC .......................................... 198/499
See application file for complete search history.

(56) References Cited

U.S. PATENT DOCUMENTS

| 2,551,123 | A | * | 5/1951 | Heller | 198/499 |
| 3,656,610 | A | | 4/1972 | McWilliams | |
| 4,036,351 | A | * | 7/1977 | Reiter | 198/499 |
| 4,053,045 | A | | 10/1977 | Reiter | |
| 5,518,107 | A | | 5/1996 | Schwarze | |
| 5,657,853 | A | * | 8/1997 | Pennino | 198/499 |
| 6,820,734 | B1 | * | 11/2004 | Gilbert et al. | 198/499 |
| 7,275,634 | B1 | * | 10/2007 | Hinson | 198/499 |
| 8,201,682 | B2 | * | 6/2012 | DeVries | 198/499 |
| 2010/0000842 | A1 | * | 1/2010 | DeVries et al. | 198/499 |

FOREIGN PATENT DOCUMENTS

EP       1036748 A2    9/2000

OTHER PUBLICATIONS

Search Report dated Apr. 2, 2013 for PCT/IN2012/000756.

* cited by examiner

*Primary Examiner* — Mark A Deuble
(74) *Attorney, Agent, or Firm* — Locke Lord LLP; Joshua L. Jones; Christopher J. Cillié

(57) ABSTRACT

A belt scraper mounting for belt conveyors with a conveyor frame/stringer includes a scraper blade module assembly and a scraper fixing mount. The scraper fixing mount holds the blade module assembly with the conveyor frame/stringer on both sides of the scraper blade module assembly and functions in an auto adjusting mode.

9 Claims, 6 Drawing Sheets

BELT SCRAPER MOUNTING

CROSS-REFERENCE TO RELATED APPLICATIONS

This application is the national phase under 35 U.S.C. §371 of PCT International Application No. PCT/IN2012/000756, filed Nov. 20, 2012, which claims priority to Indian Patent Application No. 22/KOL/2012, filed Jan. 9, 2012, the contents of which is incorporated herein by reference.

FIELD OF THE INVENTION

The present invention in general relates to belt scrapers for its application in bulk material handling belt conveyors and in particular, to an improved belt scraper mounting with increased cleaning efficiency, which is easy to install and possess auto adjustment mechanism, requires no maintenance for a long period and has reduced operational and cleaning cost.

BACKGROUND OF THE INVENTION

Belt Scrapers are used in bulk material handling belt conveyors to avoid material carry back, reduce spillage and keep belt clean. Clean belts help prevent material build up on snub pulley and return rollers and increase its life, thereby reducing cleaning cost, downtime cost and mis-tracking of the belt.

In first generation Counter weight belt scraper, single blade design is made from thick, rubber strip (wider than belt width) under the return belt and the counter weight provided at the side of the belt scraper with a pivot point to provide contact with the belt. The initial load exerted to the belt is approximately 80-90 Kgs. With time when the cleaning effectiveness reduces, the weight is increased and it can go up to 150 Kgs.

Cleaning efficiency is approx 60-68% and always, it is needed to increase counter weight load on a regular basis against blade wear. It is very less effective and high maintenance is involved.

Second generation fixed mount belt scraper's segmented blades module are made of hard alloy steel with rubber cushion at the bottom of blade mounted on a steel tube with both end fixed mount. It does not have automatic adjustments against blade wear. It provides inconsistent contact pressure to the belt which is approximately 100-125 Kgs.

Cleaning efficiency is approx 70-85% and always, there is need to lift-up of the fixed mount on a regular basis against blade wear. It is less effective and high maintenance involved.

Pneumatically operated third generation belt scraper having segmented blades module are made of hard alloy steel with or without polymer cushion at the bottom mounted of blade on a steel tube with ratchet and pinion mount and adjustment done through compressed air at 7-10 bars pneumatically. They provide inconsistent load to the belt of approximately 90-110 Kgs.

Cleaning efficiency is approx 75-85%. There is a need to pump air periodically to maintain the blade to belt contact due to drop in air pressure/leakage/chocking of air. Maintenance requirement is high.

In fourth generation belt scrapers with shock absorber which acts as semi automatic adjustments to some extent but, there is a need for periodic manual adjustments against blade wear in every 3-4 weeks interval. This type of belt scrapers have segmented type metallic blades module with pivot point below the scraping edge mounted on a steel tube with both ends rubber shock absorber. It provides comparatively less load to the belt, which is approximately 24-80 Kgs.

Cleaning efficiency is approx 92-95%. It provides less consistency against heavy duty, high speed, vibration and bi-directional belt operation.

Accordingly there was a long felt need to design belt scraper mountings which are maintenance free and long lasting and facilitates automatic adjustment in the field of bulk material handling conveyor systems to meet the increasing belt capacity (tonnages), higher belt speed and heavy duty of belt with wider belt conveying system.

The present invention meets the aforesaid long felt need.

All through out the specification including the claims, the words "conveyor belt", "scraper blade" "scraper holding arm", "spring", "washer", "stud", and "nut" are to be interpreted in the broadest sense of the respective terms and includes all similar items in the field known by other terms, as may be clear to persons skilled in the art. Restriction/Limitation if any, referred to the specification, is solely by way of example and understanding the present invention.

OBJECTS OF THE INVENTION

It is the principal object of the present invention to provide an improved belt scraper mounting which is maintenance free and provide long lasting cleaning efficiency & facilitates automatic adjustment in the field of bulk material handling conveyor systems to meet the increasing belt capacity (tonnages), higher belt speed and duty of belt with wider belt conveying system.

It is another object of the present invention to provide an improved belt scraper mounting system possessing higher efficiency of belt cleaning compared to the contemporary belt scrapers.

It is yet another object of the present invention to provide an improved belt scraper mounting system which provides easy and flexible installation.

It is a further object of the present invention to provide an improved belt scraper mounting which provides auto adjustment mechanism and compensate the need of varying loads to maintain contact with the belt.

It is a further object of the present invention an improved belt scraper mounting system which requires absolutely no maintenance for a very long period.

It is another object of the present invention to provide an improved belt scraper mounting system possessing reduced operational and cleaning cost.

It is another object of the present invention to provide an improved belt scraper mounting system which possesses & confirmed precision belt cleaning.

It is yet another object of the present invention to provide an improved belt scraper mounting system which completely eliminates sagging of scraper assembly permanently and confirmed precision belt cleaning continuously.

It is another object of the present invention to provide an improved belt scraper for its application in bulk material handling conveyor systems, which is equipped with automatic scraper adjustment against blade wear and does away with the need for manual lifting of scraper fixing mount in an upward direction towards the belt to compensate blade wear.

How the foregoing objects are achieved and the other aspects of the present invention will be clear from the following description which is purely by way of understanding and not by way of any sort of limitation.

SUMMARY OF THE INVENTION

Accordingly, the present invention provides an improved belt scraper mounting for belt conveyors having conveyor frame/stringer, comprising: a scraper blade module assembly and a means for holding said blade module assembly with said conveyor frame/stringer on both sides of said belt scraper, said means being adapted to function in an auto adjusting mode.

In accordance with preferred embodiments of the belt scraper mounting of the present invention:

said means composes of an upper dynamic spring adjuster and a lower dynamic spring adjuster;

said belt scraper works in the range from 300 mm and 3200 mm of belt width and said upper dynamic spring adjuster and said lower dynamic spring adjuster together constitute a dynamic auto adjusting scraper fixing mount;

said upper and lower dynamic spring adjuster are operatively adapted to be connected with a scraper holding arm through a long stud, said blade module assembly being mounted on said scraper holding arm and said scraper holding arm being kept in position by means of a step washer;

said auto adjusting mount comprises of a pair of helical springs in which said lower spring has higher suspension stability than said upper spring;

said dynamic auto adjusting scraper fixing mount is adapted to hold a circular tube scraper blade module assembly;

said dynamic auto adjusting scraper fixing mount is adapted to hold a square/rectangular/triangular or any other cross-section tube scraper blade module assembly;

one helical spring is placed above said scraper holding arm and another helical spring is placed below said scraper holding arm and are kept in position by means of washer and nut arrangement.

said nut arrangement comprises shoulder nuts adapted to be compressed by 30 mm in either direction, so as to ensure stability against belt velocity/precision cleaning.

The present invention also provides a method for applying a belt scraper for bulk material handling belt conveyors having conveyor frame/stringer, in the manner such as herein described, a scraper blade module assembly and a means for holding said blade module assembly with said conveyor frame/stringer on both sides of said belt scraper, said means being adapted to function in an auto adjusting mode.

BRIEF DESCRIPTION OF THE ACCOMPANYING DRAWINGS

The nature and scope of the present invention will be better understood from the accompanying drawings, which are by way of illustration of some preferred embodiments and not by way of any sort of limitation. In the accompanying drawings.

DETAILED DESCRIPTION OF THE INVENTION

The following describes some preferred embodiments of the present invention, which are purely for the sake of understanding the performance of the invention, and not by way of any sort of limitation.

As stated before the present invention primarily aims at providing improved belt scrapers mounting system which is maintenance free and long lasting and facilitates automatic adjustment in the field of bulk material handling conveyor systems to meet the increasing belt capacity (tonnages), higher belt speed and heavy duty of belt with wider belt conveying system.

Belt Scrapers generally consist of two different major parts namely, a) Scraper Blade module Assembly and
b) Scraper Fixing Mount.

Scraper Blade module Assembly: It is mounted on a steel tube by means of nuts and bolts and placed under the belt to touch and clean the belt surface.

Scraper Fixing Mount: It holds the scraper blade module assembly against the belt both sides of the tube to the conveyor stringer frame by means of nuts and bolts. Thus, there is no automatic scraper adjustment against the blade wear hence, always need manual lifting of scraper fixing mount upward direction towards the belt to compensate the blade wear.

In the present invention the existing scraper fixing mount is replaced by dynamic auto adjusting mount. This feature is indispensable for the invention.

Figure 1:
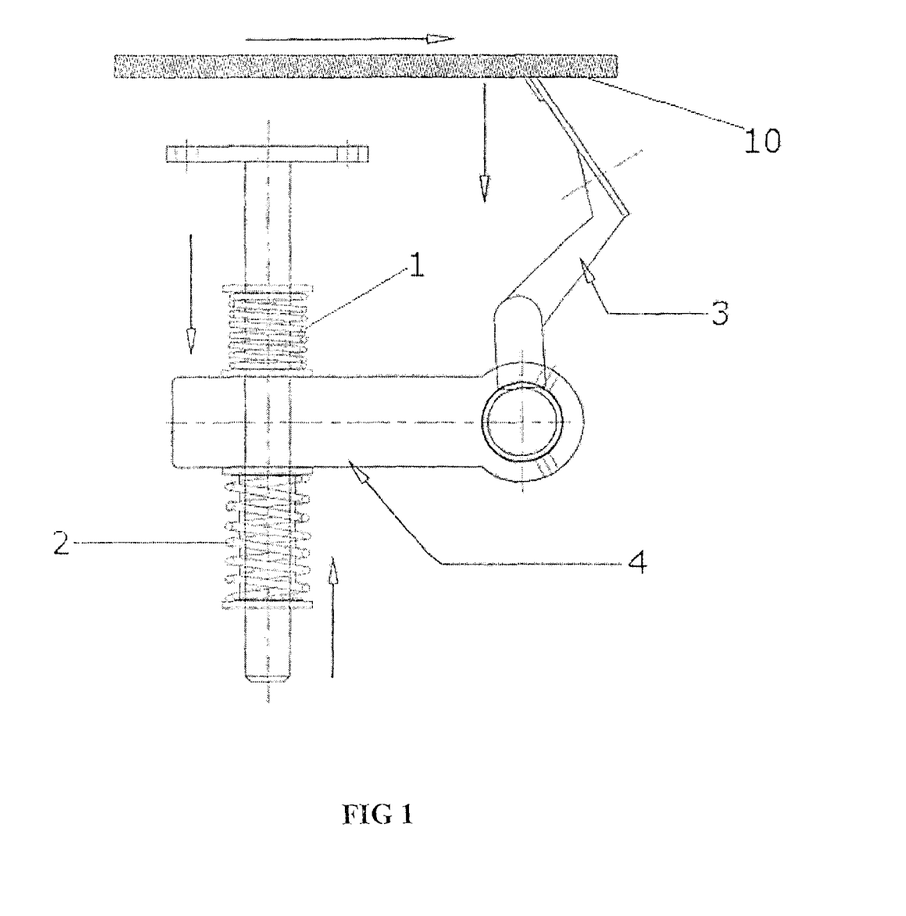
FIG. 1 illustrates a perspective view of the improved belt scraper mounting in accordance with a preferred embodiment of the present invention.

FIG. 1 illustrates a perspective view of the improved belt scraper in accordance with a preferred embodiment of the present invention. The entire belt scraper assembly wherein the scraper blade module is in contact with the conveyor belt is provided in the said figure. As shown in the figure the scraper holding arm (4) on which the scraper blade module (3) is mounted and kept in position by a heavy duty upper dynamic spring adjuster (1) located above it and another heavy duty lower dynamic spring adjuster (2) located below it.

To meet the growing market demand of maintenance free and long lasting automatic adjustment of Belt Scraper in the field of bulk materials handling conveyor systems and to meet the increasing belt capacity (tonnages), higher belt speed and duty of belt with wider belt conveying system, the present invention thus provides an automatic and long lasting vibration and maintenance free belt scraper suspension for the belt width 300-3200 mm.

The improved belt scraper automatic adjusting mount in the present invention, primarily consists of:

1) Heavy Duty Upper Dynamic Spring Adjuster (1)
2) Heavy Duty Lower Dynamic Spring Adjuster (2)
3) Step Washer (5), Stud (6) and so on as described hereinafter.

Figure 2:
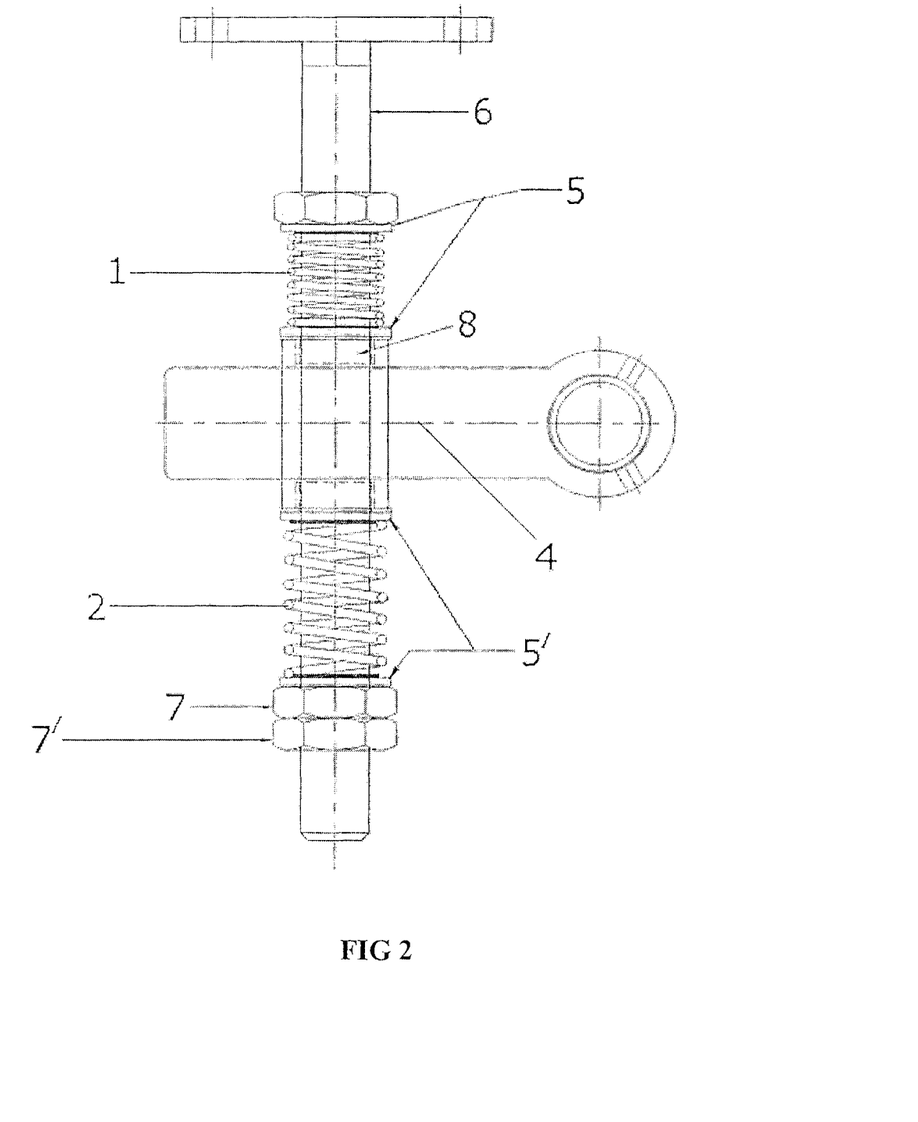
FIG. 2 illustrates a detailed sectional view of the improved belt scraper mounting according to a preferred embodiment of the present invention.

The accompanying FIG. 2 illustrates a more detailed sectional view of the improved belt scraper mounting showing its different components as according to a preferred embodiment of the present invention. As shown in the figure the springs (1,2) are kept in position by a couple of flat washers (5,5') on either side of the spring and tightened by means of a lock nut (7,7') arrangement. The scraper holding arm is kept in position by means of a step washer (8). The springs (1, 2) are affixed on the conveyor frame by means of a stud (6).

Figure 3:
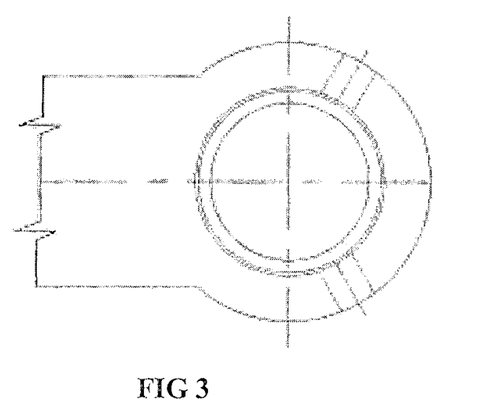
FIG. 3 illustrates a sectional view of the circular tube scraper blade module assembly holding.
Figure 4:
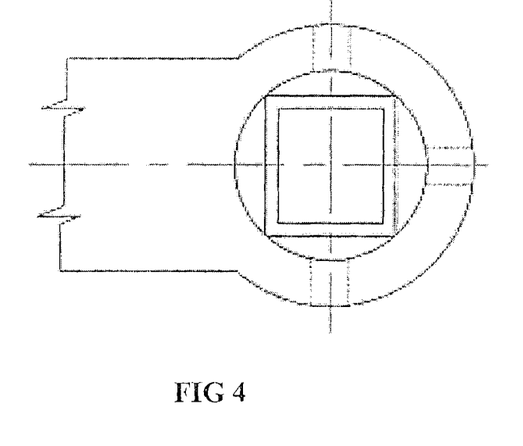
FIG. 4 illustrates a sectional view of the square tube scraper blade module assembly holding.

The FIG. 3 shows a circular tube scraper blade assembly, while in FIG. 4, the same is square. It is to be understood that the dynamic auto adjusting scraper fixing mount of the belt scraper mounting according to the present invention, is adapted to hold a square/rectangular/triangular or any other cross-section tube scraper blade module assembly.

In the present invention the improved belt scraper holds the existing blade module assembly with the conveyor frame/stringer. The dynamic spring assembly (1,2) with scraper holding arm (4) inserted through a long stud, boost the existing scraper blade module assembly to a new high degree of cleaning efficiency continuously while in touch with the belt surface in suspension/floating condition, even after the scraper blades modules gets worn-out. Thus, it delivers vibration free precision belt cleaning for a long period without any manual adjustment/servicing.

Design Calculations involved in said improved belt scraper as according to the present invention with a few hypothetical parameters is illustrated as follows:

Load Calculation for 1000 mm Belt Width Scraper (Material Specification: EN 45).

Force (F)=Load due to scraper assembly weight+Load due to belt velocity+Load due to pressure given by the blade+Load of upper spring,

F=(F1+F2+F3+F4)

F1=(45−2×6.1)×9.81=322 N.

F2=(Power transmitted by the motor/Belt velocity) Cos 60×Cos 30.

F3=8×5×9.81=393 N.

F4=Max.1800 N (Consider as per design).

So, F=(322+F2+393+1800)=(2515+F2) N.

Lower Spring Calculation:

Let consider, W=Design the spring at max. load of 5000 N [for Safety Purpose].

Free Length of Spring=130 mm.

Length at Full Load=100 mm.

Inner Dia. of Spring=45 mm.

Shear Stress=8×F×D/3.14 d^3 [Allowable Shear Stress=450 N/mm^2]

d=10.74 mm.

Spring Index (C)=5.18

Wahl's Correction Factor (K)=(4C−1)/4C−4)+0.615/C=1.29

Therefore, Modified Wire Dia, $$\text{Shear Stress} = K \times 8 \times W \times D / 3.14 d \wedge 3$$

$$d = 12 \text{ mm.}$$

$$\text{Total Deflection} = 8 \times W \times C \wedge 3 \times N / G \times d \left[ \begin{array}{l} G = \text{Modulous of Rigidity} \\ = 84 \ GPa, N = 7 \end{array} \right]$$

$$= 30 \text{ mm.}$$

$$\text{Spring Constant} = 5000/30 = 167 \ N/\text{mm.}$$

Upper Spring Calculation:

Lets consider, W=Design the spring at max. load of 2700 N [for Safety Purpose].

Free Length of Spring=80 mm

Length at Full Load=50 mm.

Inner Dia. of Spring=45 mm.

Shear Stress=8×F×D/3.14 d^3 [Allowable Shear Stress=450 N/mm^2]

d=8.75 mm.

Spring Index (C)=6.14

Wahl's Correction Factor (K)=(4C−1)/(4C−4)+0.615/C=1.246

Therefore, Modified Wire Dia, $$\text{Shear Stress} = K \times 8 \times W \times D / 3.14 d \wedge 3$$

$$d = 12 \text{ mm.}$$

$$\text{Total Deflection} = 8 \times W \times C \wedge 3 \times N / G \times d \left[ \begin{array}{l} G = \text{Modulous of Rigidity} \\ = 84 \ GPa, N = 5 \end{array} \right]$$

$$= 30 \text{ mm.}$$

$$\text{Spring Constant} = 2700/30 = 90 \ N/\text{mm.}$$

Suspension Stability of Spring for 1000 mm Belt Width Scraper:

Downward Force Given by Upper Spring (M)=90×22=1980 N. [Upper Spring Compression is 22 mm].

Downward Force by Belt Conveyor due to Belt Velocity=(10×10^3/3) Cos 60×Cos 30 [Motor=10 Kw, Belt Speed=3 m/sec]=1445 N Considering, Force Balance on One Side Spring. The above Force to be half of the Total Force.

So, Downward Force by Belt Conveyor due to Belt Velocity (N)=1445/2=722 N. [Load of half Scraper Wt=50/2=25 Kgs. of 1000 mm B/W]

Total Downward Force of Upper Spring (P)=(M+N+O)=(1980+722+250)=2952 N.

Upward Force given by Lower Spring (Q)=167×14=2338 N+Load of Rubber Suspension of Scraper [Wt=125 Kgs. of 1000 mm B/W and Lower Spring Compression is 14 mm]=2338 30 1250=3588 N.

Total Upward Force of Lower Spring (Q)=3588 N.

Suspension Stability of Lower Spring=R=(Q−P)=(3588−2952)=636 N.

Therefore, Percentage of Suspension Stability of Lower Spring against Upper Spring=(Q−P)/P×100%=21.54%.

The non-limiting advantages achieved by the improved belt scraper are as follows:

1. Easy/Flexible Installation.
2. Auto Adjustment/No Maintenance for a long period (12-16 Weeks min).
3. Confirm Precision Belt Cleaning (Clean up-to 0.05-0.1 mm thin layer of carry back).
4. High Cleaning Efficiency for a long period (12-16 Weeks min),
5. Reduced Operational and Cleaning Cost.
6. Presence of automatic adjustment against blade wear does away with the need for normal lifting of scraper fixing mount in upward direction, towards the belt to compensate the blade module wear.

The improved belt scraper mounting is very handy and suitable for all type of belt scrapers replacing the existing fixed mount assembly, unscrewing the nut/bolt. Also, it has an option for circular, square, rectangular or any other cross-section tube scraper blade module assembly holding facilities as shown in the accompanying FIGS. 3 and 4 respectively.

Automatic Adjustment:

As stated before, the improved belt scraper has two dynamic helical spring assemblies (1,2), one each is placed above and below the scraper holding arm with adjustable shoulder nuts (77″) can be compressed by 30 mm max. in either directions and make them stable against belt velocity/precision belt cleaning (Shown in FIGS. 1 and 2).

Since the lower spring having approx 20% higher suspension stability than upper spring it always keep the scraper blade module (3) in touch with the belt surface (10) automatically, even after the blade module wear. Therefore, no maintenance is required for a longer period.

Precision/High Efficiency Belt Cleaning:

The improved belt scraper cleans the belt surface further to a new high degree of precision cleaning, to remove even inherent micro fines materials and moisture from the belt surface.

Figure 7:
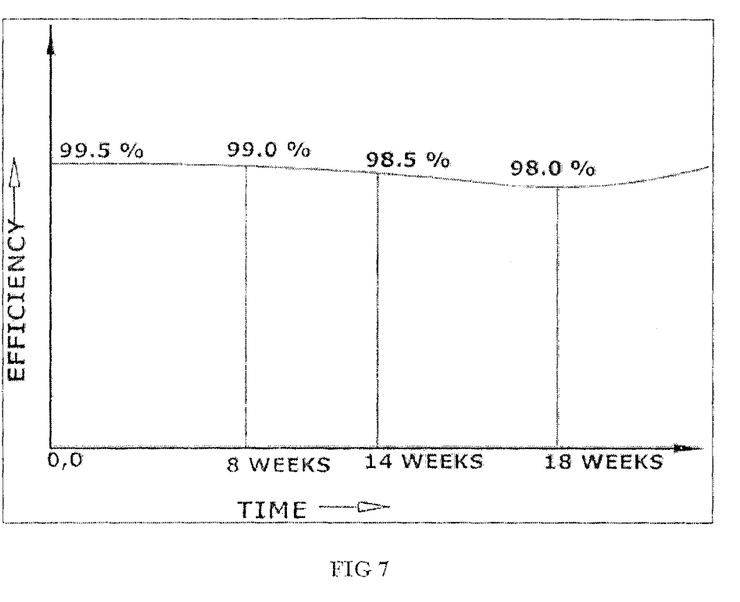
FIG. 7 illustrates the efficiency curve achieved by the improved belt scraper mounting of the present invention.

Also, it prevents sagging of existing scraper assembly due to its dynamic spring assembly design. Thus, cleaning efficiency increases up to a level of 99.5% as shown in FIG. 7.

Figure 5:
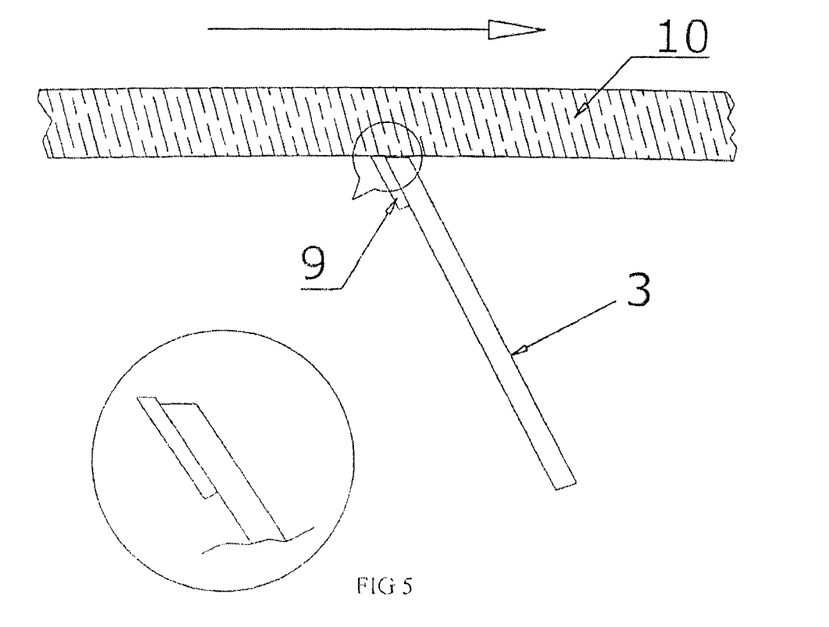
FIG. 5 illustrates the method of precision belt cleaning with the improved belt scraper mounting of the present invention.

FIG. 5 illustrates precision belt cleaning as performed by the improved belt scraper mounting of the present invention. It shows a belt scraper blade module assembly fitted with highly wear resistant tip brazed with its supporting base approximately 1 mm above for the very minimal frictional contact with the belt surface at an angle against the direction of belt. This ensures sharp and precision cleaning of inherent carry back materials and moisture from the micro contours of the belt surface efficiently. With the help of the improved belt scraper mounting according to the present invention the blade module tip is kept in position for a longer period ensuring unhindered performance for a substantially long period of time.

Figure 6:
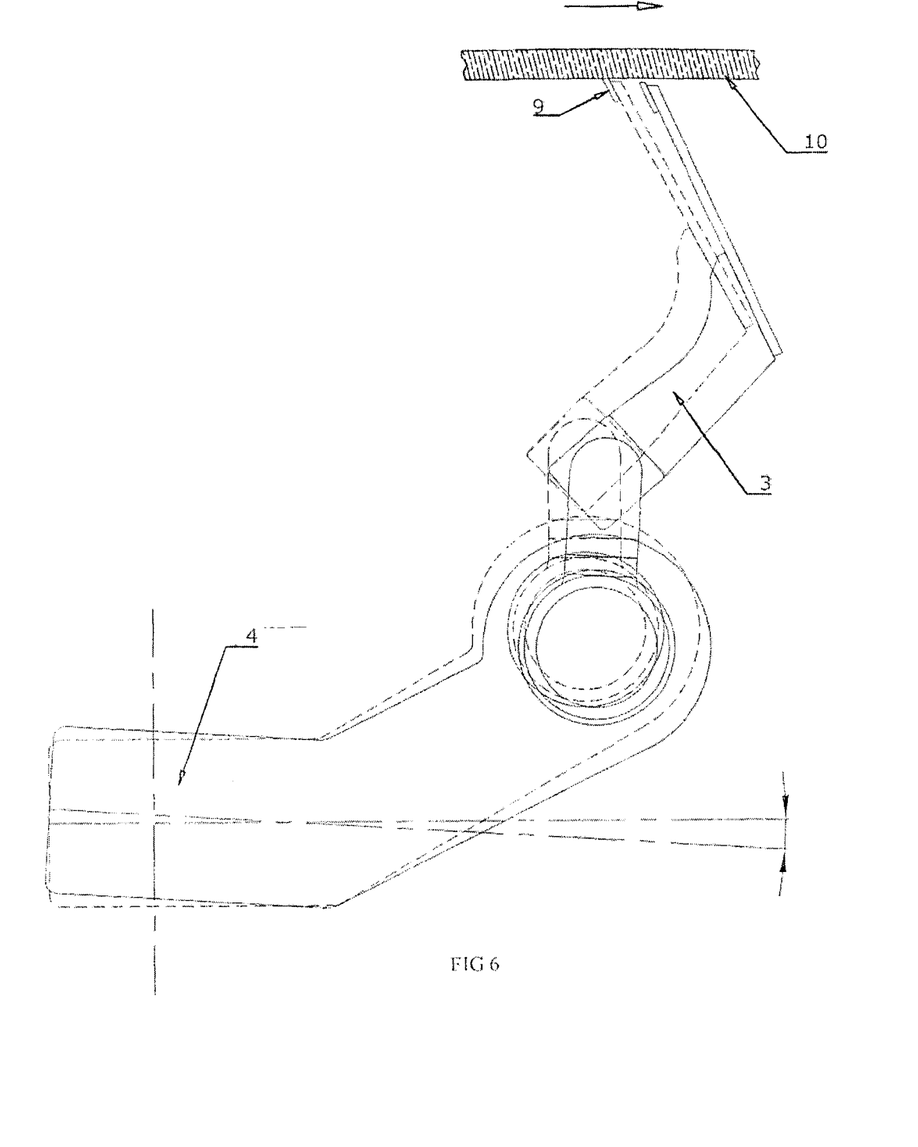
FIG. 6 illustrates sagging of belt scraper assembly known in the art.

FIG. 6 illustrates sagging of existing belt scraper assembly. The firmed line specifies the minor sagging of existing belt scraper assembly by approximately 3° two to three weeks after initial installation. This sagging also to be prevented and firmed contact with the belt surface always to be maintained by using dynamic spring mounting assembly. The reference numeral (9) indicates the scraping edge initially after installation. The reference numeral (10) indicates the belt direction.

The dynamic auto adjusting scraper fixing mount of the belt scraper mounting according to the present invention, is adapted to hold a square/rectangular/triangular or any other cross-section tube scraper blade module assembly;

Reduced Operational and Cleaning Cost:

In the improved belt scraper the cleaning efficiency is enhanced by 14.5% also preventing existing scraper assembly sagging, thereby improving productivity and reducing manpower/maintenance cost. FIG. 7 illustrates the efficiency curve achieved by the improved belt scraper of the present invention on trial run. It can be seen that even after eighteen weeks of usage, the efficiency is 98%. Comparatively, on running with $2^{nd}/3^{rd}$ generation scrapers, after two weeks, the efficiency has been found to be 75% only as compared to the initial efficiency of 85%. With $4^{th}$ generation scrapers, after 4 weeks the efficiency has been found to 92% from 95% initially.

All blade module assemblies can be directly mounted with the improved version of the belt scraper according to the present invention, to achieve automatic scraper adjustments with high belt cleaning efficiency, precision belt cleaning of 98-99.5% for a longer period without any maintenance thereby, highly reduced carry back, manpower, downtime and increased productivity/reduced cost.

The present invention has been described with reference to some drawings and preferred embodiments, purely for the sake of understanding and not by way of any limitation and the present invention includes all legitimate developments within the scope of what has been described hereinbefore and claimed in the appended claims.

The invention claimed is:

1. An improved belt scraper mounting, comprising:
   a scraper blade module assembly and a scraper fixing mount holding said blade module assembly with said conveyor frame/stringer on both sides of said scraper blade module assembly, said scraper fixing mount being configured and adapted to function in an auto adjusting mode,
   wherein said scraper blade module assembly works in the range from 300 millimeters and 3200 millimeters of belt width and said upper dynamic spring adjuster and said lower dynamic spring adjuster together constitute a dynamic auto adjusting scraper fixing mount, and
   wherein said dynamic auto adjusting scraper fixing mount comprises of a pair of helical springs in which a lower of the pair of helical springs has higher suspension stability than an upper of the pair of helical springs.

2. The improved belt scraper mounting as recited in claim 1, wherein said upper and lower dynamic spring adjuster are operatively adapted to be connected with a scraper holding arm through a stud, said scraper blade module assembly being mounted on said scraper holding arm and said scraper holding arm being kept in position with a step washer.

3. The improved belt scraper mounting as recited in claim 1, wherein said dynamic auto adjusting scraper fixing mount is adapted to hold a circular tube scraper blade module assembly.

4. The improved belt scraper mounting as recited in claim 1, wherein said dynamic auto adjusting scraper fixing mount is adapted to hold a tube of a scraper blade module assembly having a square cross-section, a rectangular cross-section, or a triangular cross-section.

5. An improved belt scraper mounting, comprising:
   a scraper blade module assembly and a scraper fixing mount holding said blade module assembly with said conveyor frame/stringer on both sides of said scraper blade module assembly, said scraper fixing mount being configured and adapted to function in an auto adjusting mode,
   wherein said scraper fixing mount comprises of an upper dynamic spring adjuster and a lower dynamic spring adjuster,
   wherein said upper and lower dynamic spring adjuster are operatively adapted to be connected with a scraper holding arm through a stud, said scraper blade module assembly being mounted on said scraper holding arm and said scraper holding arm being kept in position with a step washer, and
   wherein a first helical spring is arranged above said scraper holding arm and a second helical spring is arranged below said scraper holding arm, wherein at least one of the first and second helical springs is kept in position with a washer and nut arrangement.

6. The improved belt scraper mounting as recited in claim 5, wherein said scraper blade module assembly works in the range from 300 millimeters and 3200 millimeters of belt width and said upper dynamic spring adjuster and said lower dynamic spring adjuster together constitute a dynamic auto adjusting scraper fixing mount.

7. The improved belt scraper mounting as recited in claim 5, wherein said washer and nut arrangement comprises a shoulder nut configured and adapted to be compressed by 30 mm in either direction, so as to ensure stability against belt velocity/precision cleaning.

8. A method for applying a belt scraper mounting for bulk material handling belt conveyors having conveyor frame/stringer, the method comprising:

connecting a scraper blade module assembly and a means for holding said blade module assembly with said conveyor frame/stringer on both sides of said belt scraper, said means being adapted to function in an auto adjusting mode, wherein said scraper blade module assembly works in the range from 300 millimeters and 3200 millimeters of belt width and said upper dynamic spring adjuster and said lower dynamic spring adjuster together constitute a dynamic auto adjusting scraper fixing mount, and wherein said dynamic auto adjusting scraper fixing mount comprises of a pair of helical springs in which a lower of the pair of helical springs has higher suspension stability than an upper of the pair of helical springs.

9. A method for applying a belt scraper mounting for bulk material handling belt conveyors having conveyor frame/stringer, the method comprising:

a scraper blade module assembly and a scraper fixing mount holding said blade module assembly with said conveyor frame/stringer on both sides of said scraper blade module assembly, said scraper fixing mount being configured and adapted to function in an auto adjusting mode, wherein said scraper fixing mount comprises of an upper dynamic spring adjuster and a lower dynamic spring adjuster, wherein said upper and lower dynamic spring adjuster are operatively adapted to be connected with a scraper holding arm through a stud, said scraper blade module assembly being mounted on said scraper holding arm and said scraper holding arm being kept in position with a step washer, and wherein a first helical spring is arranged above said scraper holding arm and a second helical spring is arranged below said scraper holding arm, wherein at least one of the first and second helical springs is kept in position with a washer and nut arrangement.

* * * * *